Figure 2:
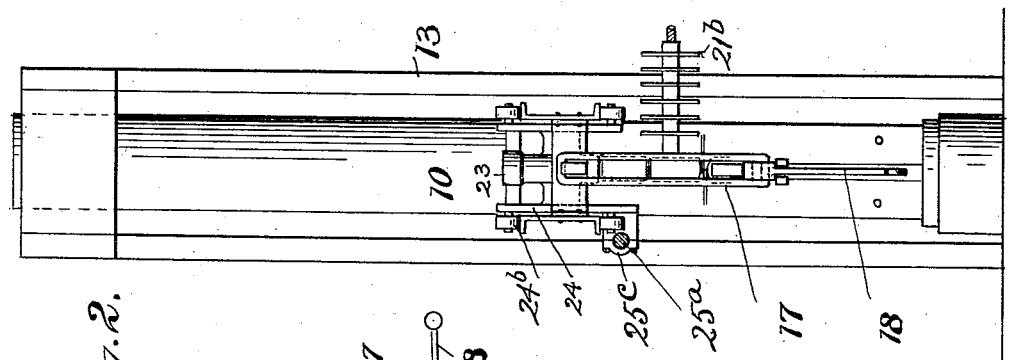

R. F. NAILLER.
SEAM WELDING APPARATUS.
APPLICATION FILED SEPT. 25, 1911.

1,031,812.

Patented July 9, 1912.

2 SHEETS—SHEET 1.

Witnesses
E. B. Gilchrist
H. B. Sullivan

Inventor
Raymond F. Nailler
by
Thurston & Kwis
Attys.

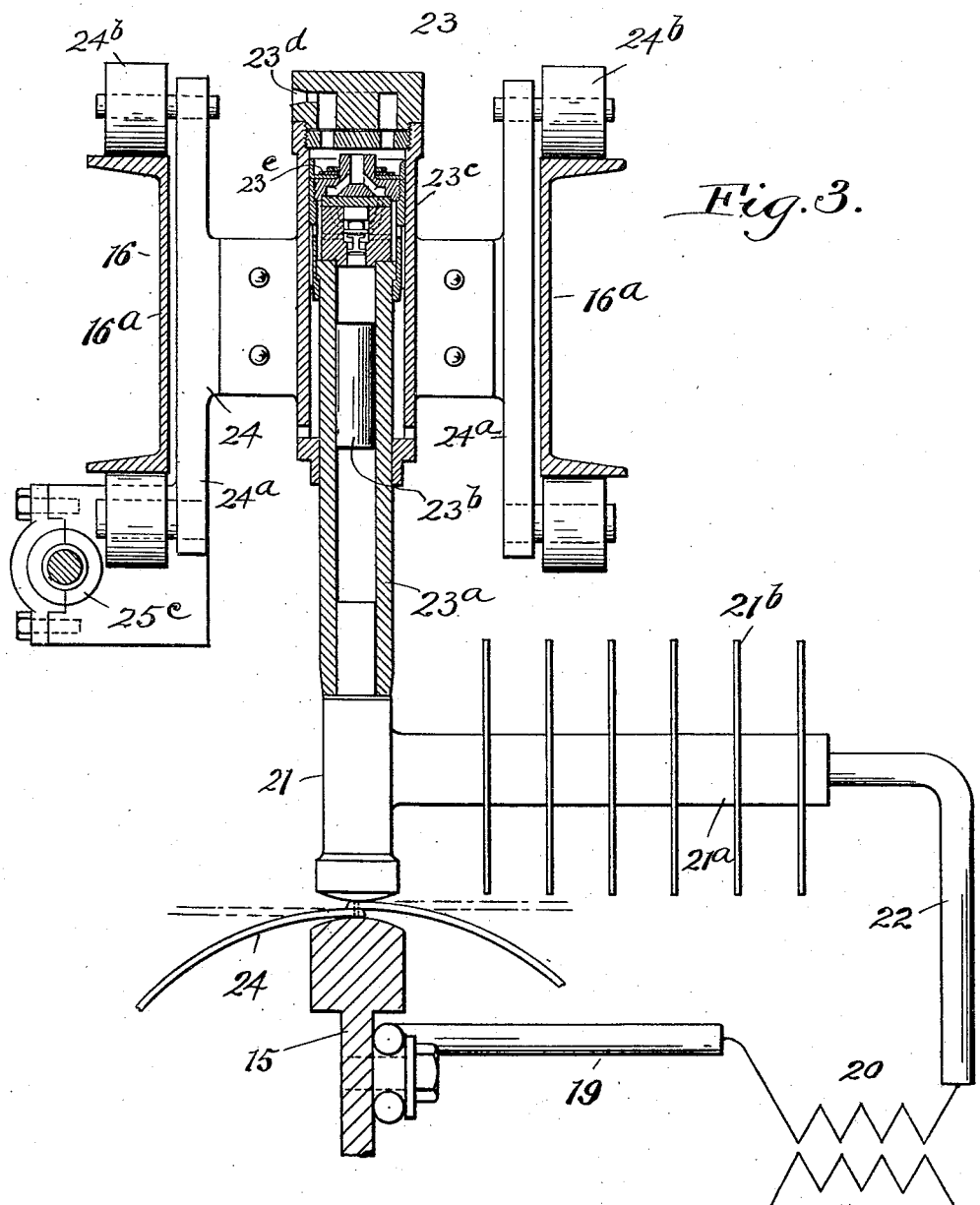

UNITED STATES PATENT OFFICE.

RAYMOND F. NAILLER, OF ELYRIA, OHIO.

SEAM-WELDING APPARATUS.

1,031,812.

Specification of Letters Patent.

Patented July 9, 1912.

Application filed September 25, 1911. Serial No. 651,081.

*To all whom it may concern:*

Be it known that I, RAYMOND F. NAILLER, a citizen of the United States, residing at Elyria, in the county of Lorain and State of Ohio, have invented a certain new and useful Improvement in Seam-Welding Apparatus, of which the following is a full, clear, and exact description.

This invention relates to seam welding apparatus of a type wherein longitudinal or circumferential seams or joints of plates, tubes, boilers and the like are welded by the combined action of an electric heating current and by the delivery of rapid welding blows at the point of application of the heating current.

At the present time, practically all of the commercial seam welding wherein the seam is of any considerable length is accomplished either by the oxyacetylene blowpipe or by oven heating, during which the entire length of seam is heated at the same time, and subsequent welding by hand or machine. Both these methods are more or less objectionable and unsatisfactory, for many reasons, among which are the excessive cost of the completed weld, the length of time required in welding, non-uniformity of weld and weak spots in the seam, and the rough and unclean condition of the article after the completion of the weld.

The object of the present invention is to provide a welding apparatus which overcomes the above named objections, and particularly, the invention aims to provide an apparatus wherein very efficient and homogeneous or uniform seam welding can be accomplished quickly and inexpensively.

With my improved apparatus, the welding is accomplished by passing a heating current across the joint or between the parts to be welded, applying a heavy pressure to the work, delivering rapid welding blows at the heated part, and simultaneously causing a uniform and gradual relative movement between the work and the hammer and the point of application of the electric current so that the seam is welded progressively and uniformly throughout its length.

In the embodiment of my invention shown in the drawings, wherein longitudinal seams are adapted to be welded, I make use of a long fixed mandrel which supports the work and constitutes one of the electric terminals, and I arrange for movement along the seam and along the mandrel, a combined hammer head and electrode or contact, which acting with the mandrel, causes the passage of electric current across that part of the seam at which the hammer head and contact is applied and through this hammer head, there is caused the delivery of pressure, and rapid welding blows to the heated part. In conjunction with the hammer head, I employ a traveling hammer, preferably pneumatically operated, which creates the pressure on and also delivers hammer blows to the hammer head, this hammer being preferably mounted on a carriage adapted to be moved along a support and guideway arranged above and in proximity to the mandrel and coextensive therewith, the movement of the carriage and hammer causing the movement of the associated hammer head and the progressive application of the current pressure, and welding blows along the seam. By shifting the hammer at a uniform rate, preferably by a constant speed motor, uniform welding is obtained from one end of the seam to the other.

My invention may be briefly summarized as consisting in certain novel details of construction and combinations and arrangements of parts which will be described in the specification and set forth in the appended claims.

Figure 1:
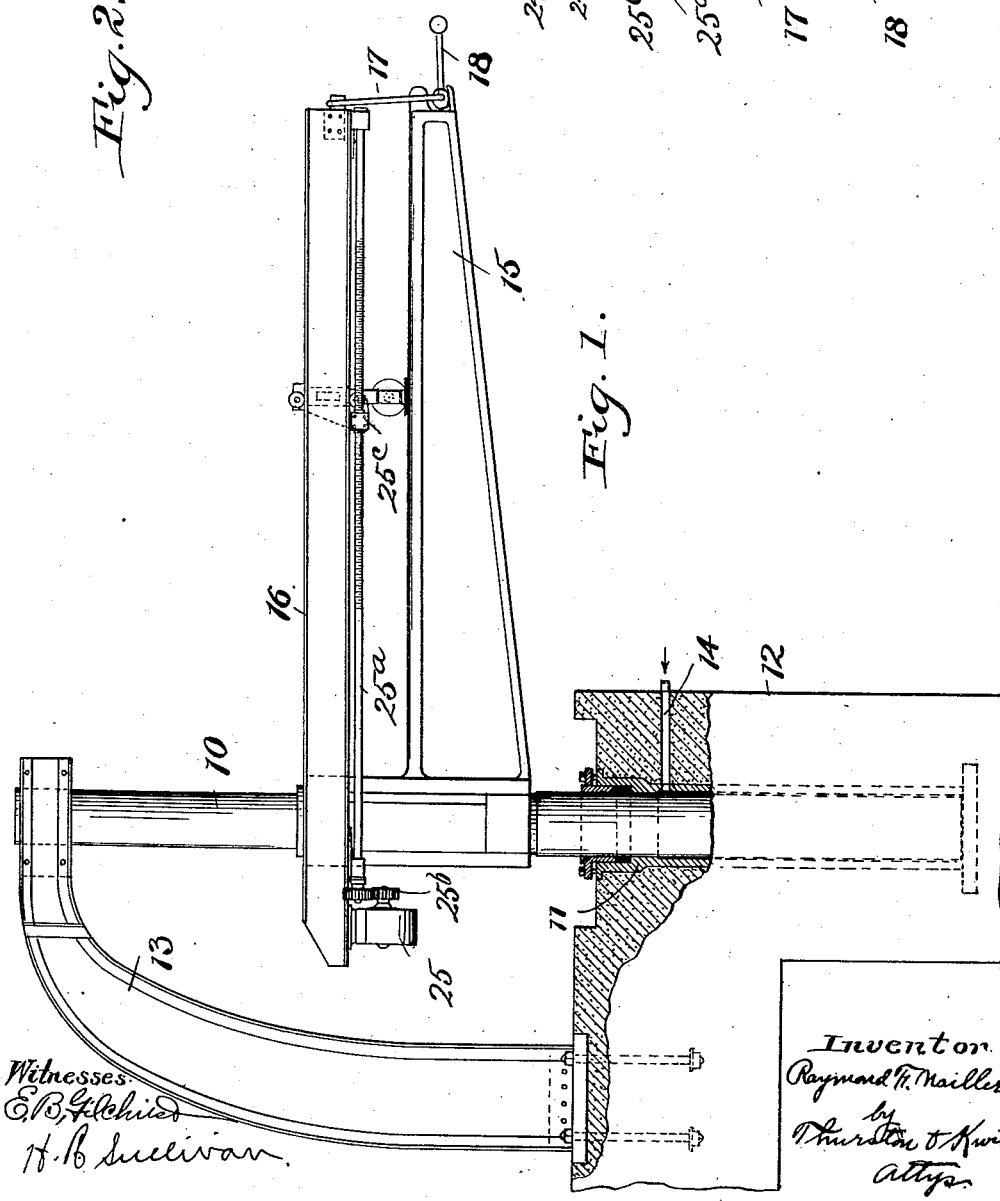

Figure 1 is a side elevation of my improved seam welding apparatus; Fig. 2 is an end view of the same looking toward the left of Fig. 1; and Fig. 3 is a transverse sectional view on an enlarged scale.

In the preferred form of my invention, I mount the active parts of the apparatus upon a vertically movable hydraulic piston 10, the lower portion having a working fit within a cylinder 11, located within a concrete or other suitable foundation 12, and the upper portion being guided within the overhanging end of a strut 13, suitably supported and anchored at its lower end. Normally, the piston 10 and the parts carried thereby are at a fixed elevation above the floor line, but by the admission or withdrawal of fluid pressure through a suitable port and passageway 14, the apparatus may be elevated or lowered, in accordance with the character and size of work being operated on.

Secured to this piston and projecting laterally therefrom or in a horizontal direction is a mandrel 15, upon which the work is supported, this mandrel being especially adapted for tube and boiler work, which can be readily slipped onto the same from the free end. Also extending laterally outward from the piston 10 directly above and coextensive with the mandrel is a combined support and guideway 16 for a traveling carriage which supports the hammer and combined hammer head and electric contact or terminal to be referred to presently. This support and guideway preferably consists of two parallel channels 16ª arranged back to back or with their flanges extending horizontally in opposite directions.

The work to be welded is inserted between the mandrel and support 16, and after the work is in place, the free ends of these parts are designed to be fastened together by a link 17, and locking lever or handle 18. To insert the work onto the mandrel, the lever 18 is thrown upwardly so as to permit the link to be released and swung downwardly, and to lock the mandrel and support after the work is in position, the link is replaced and the lever 18 thrown downwardly.

The mandrel 15 constitutes one of the terminals or contacts of the welding circuit, and has one terminal conductor 19 of a low voltage high amperage circuit 20 connected thereto. To apply the welding heat locally to one part of the work at any instant and progressively along the seam, I employ a combined hammer head and electric terminal or contact 21, the lower end of the hammer head being arranged just above the mandrel and in the central plane therewith. This hammer head and terminal 21 is provided with a laterally projecting arm 21ª which is provided with cooling flanges 21ᵇ and has connected thereto the second terminal conductor 22 of the welding circuit 20.

In connection with the hammer head 21, I employ a hammer 23 which is designed to maintain a substantially constant pressure on the hammer head during the welding operation and thereby press the overlapping portions of the work down onto the mandrel at the point of application of the current so as to secure at all points of the seam as the hammer head is moved along the same, good contact between the parts of the work and between the work and electric terminals. The hammer is also designed to deliver, independently of the pressure above referred to, rapid hammer blows to the hammer head and thus to the work at the point of application of the heating current. I preferably employ a pneumatic hammer, although other forms of fluid pressure or mechanical hammers might be employed. In the construction shown, the hammer includes a cylinder 23ª which receives the upper reduced end of the hammer head and terminal 21 and delivers the desired pressure to the hammer head to obtain effective contact between the parts of the work and the terminals. The hammer blows are delivered to the end of the hammer head by a reciprocating piston 23ᵇ. Surrounding the cylinder 23ª is a second cylinder or sleeve 23ᶜ containing ports and valve members which need not be described in detail. The air is admitted at the port 23ᵈ and fluid pressure is exerted upon the piston-like member 23ᵉ which bears directly on the inner barrel or cylinder 23ª, and which has a close fit within the outer cylinder. In this manner, in addition to the hammer blows on the hammer head, I am enabled to transmit to the hammer head and work through the medium of the cylinder 23ª, a constant pressure, which I prefer to have as high as 1200 pounds per square inch for certain classes of work.

The outer cylinder of the hammer is secured to and carried by a carriage or trolley 24, the hammer being located centrally between the two channels of the trolley support 16 and being supported midway between the two sides or parts 24ª of the carriage which project above and beneath the channels of the trolley support and are provided with wheels 24ᵇ which engage both the upper and lower channel flanges. The mechanism for shifting the carriage and consequently the hammer and hammer head, in the preferred embodiment of my invention, includes an electric motor 25, which is supported at the inner end of the trolley support and guideway 16, and a feed screw 25ª which is connected by gearing 25ᵇ to the motor shaft, and between its ends has a working fit in a nut 25ᶜ carried by the hammer carriage or trolley, as best disclosed in Fig. 3. With this mechanism, the hammer can be shifted lengthwise of the seam at a uniform rate in spite of the heavy pressure with which the hammer head bears onto the work.

To weld a seam between two plates or between the edges of a boiler or other tubular member, the edges are first temporarily fastened in position by pin-riveting or other suitable means and then the tubular member or other work is placed on the mandrel in the manner previously stated. The heating current is then applied and simultaneously the motor 25 and hammer 23 are started in operation, thereby causing the passage of the heating current across the joint so as to heat substantially to plasticity the work directly beneath the hammer head, and at the same time causing the parts of the work to be firmly clamped together and in good electrical contact with the terminals so as to assist in the heating action and in the confining of the current to the point beneath the hammer head, and causing simultaneously with the heating current and pressure, the delivery of the welding blows, the heating and welding action taking place gradually and at a uniform rate along the entire seam by the uniform travel of the hammer, hammer head, and progressive application of current.

Having thus described my invention, what I claim is:

1. In a lap seam welding apparatus, a mandrel adapted to support the work and constituting an electric terminal, a combined hammer head and terminal adapted to cause the passage of a heating current across the joint and to transmit heavy pressure to the overlapping parts of the work so as to cause substantially all the current to pass directly across the overlapping parts in line with the application of pressure, a hammer arranged to deliver rapid welding blows to the hammer head and terminal, and means for causing a relative movement between the work and the hammer and hammer head during the heating and welding action, so that the parts of the seam will be heated and welded gradually and progressively lengthwise of the seam.

2. In a lap seam welding apparatus, a pair of electric terminal members, one being in the form of a fixed mandrel and the other in the form of a hammer head, said mandrel and hammer-head being designed to cause the passage of a welding current across the joint and to transmit heavy pressure to the work so as to cause substantially all the current to pass directly across the overlapping parts of the work in line with the application of pressure, a hammer arranged to deliver rapid welding blows to the hammer head so as to weld together the parts at the point of application of the heating current, and means for causing during the heating and welding action and at a uniform rate, a relative movement between the work and the hammer head so that uniform heating and welding will be secured progressively along the seam.

3. In a lap seam welding apparatus, a mandrel adapted to support the work and constitute an electric terminal, a combined hammer head and terminal adapted to transmit pressure to the work and to cause the passage of a heating current therethrough across the joint, a hammer having means for causing a substantially constant pressure on the hammer head and for delivering rapid welding blows to the latter, and means for causing during the heating and welding action a relative movement between the work and the hammer and hammer head lengthwise of the seam so that the parts of the joint will be uniformly heated and welded progressively in the direction of the seam.

4. In a lap seam welding apparatus, a pair of electric terminal members, one being in the form of a fixed mandrel and the other in the form of a traveling hammer head, said mandrel and hammer head being adapted to transmit pressure to the part to be welded and to cause the passage of a welding current across the joint and to transmit sufficient pressure onto the work to cause substantially all of the current to pass through the overlapping parts of the work in line with the application of pressure, a hammer arranged to deliver rapid welding blows to the hammer head and thereby weld the seam at the point of application of the heating current, a carriage carrying said hammer, a support and guideway for the carriage, and means for shifting the carriage, hammer, and hammer head during the heating and welding action along said support so that the seam will be heated and welded progressively lengthwise thereof.

5. In a lap seam welding apparatus, a pair of electric terminal members, one being in the form of a fixed mandrel adapted to support the work, and the other in the form of a traveling hammer head, said mandrel and hammer head being designed to transmit pressure to the parts to be welded and to cause the passage of a welding current across the joint, a hammer having means for causing a substantially constant pressure to be applied to the hammer head and for delivering rapid welding blows to the latter, a support and guideway for the hammer, and means for gradually shifting the hammer and hammer head along the support lengthwise of the seam, whereby there is a progressive heating and seam welding action.

6. In a seam welding apparatus, a vertically movable support having secured thereto a laterally projecting mandrel and a support and guideway for a hammer arranged above the mandrel, a carriage adapted to travel along said support, a hammer carried by said carriage and having means for delivering a substantially constant heavy pressure and rapid welding blows to the work, and a hammer head at the lower end of the hammer adjacent the mandrel, said mandrel constituting one electric terminal and the hammer head constituting a second electric terminal and being designed to transmit pressure to and to cause the passage of a heating current between the parts to be welded, and means for shifting the carriage and hammer along the support, so that the hammer is moved gradually along the seam during the heating and welding action.

In testimony whereof, I hereunto affix my signature in the presence of two witnesses.

RAYMOND F. NAILLER.

Witnesses:
H. R. SULLIVAN,
A. F. KWIS.